United States Patent [19]

Andresen et al.

[11] 4,297,737

[45] Oct. 27, 1981

[54] SECTOR SERVO WITH SYNC MARKS

[75] Inventors: Rolf Andresen; John H. Christian, both of Tucson, Ariz.

[73] Assignee: International Business Machines Corporation, Armonk, N.Y.

[21] Appl. No.: 107,104

[22] Filed: Dec. 26, 1979

[51] Int. Cl.³ .......................... G11B 5/82; G11B 21/10
[52] U.S. Cl. ...................................... 360/135; 360/77; 360/78
[58] Field of Search ..................... 360/77–78, 360/69–71, 75, 73, 133, 135

[56] References Cited

U.S. PATENT DOCUMENTS

| | | | |
|---|---|---|---|
| 3,725,861 | 4/1973 | Hancock | 371/7 |
| 3,864,741 | 2/1975 | Schwarz | 360/77 |
| 3,919,697 | 11/1975 | Walker | 360/78 X |
| 4,048,660 | 9/1977 | Dennison et al. | 360/77 |
| 4,151,571 | 4/1979 | Caroot et al. | 360/77 |
| 4,152,734 | 5/1979 | Louth | 360/77 |
| 4,163,265 | 7/1979 | Herk | 360/78 X |

*Primary Examiner*—John H. Wolff
*Attorney, Agent, or Firm*—Walter J. Madden, Jr.

[57] ABSTRACT

A disk file employs a disk having sectors of track-following servo information interspersed around the disk between data portions. Included in each sector is a SYNC signal which is encoded to indicate the validity or invalidity of the servo information in that sector. The servo information in a sector is used only if the SYNC signal indicates that it is valid.

5 Claims, 3 Drawing Figures

SECTOR SERVO WITH SYNC MARKS

DESCRIPTION

1. Technical Field of The Invention

The present invention relates to servo positioning systems in which only sampled position data is available for feedback control.

2. Background Art

A typical positioning application to which the present invention can be applied is in connection with maintaining a magnetic head centered on information-bearing concentric tracks in a magnetic disk file of the so called "sector-servo" type. In such a file, servo position reference information is recorded in a plurality of spaced sectors interleaved between larger sectors on which the data is recorded. An advantage of such a system is that the servo information is contiguous with the recorded data so that the data tracks of interest can be followed with greater accuracy and thus packed closer together. The servo sectors must be sampled at times defined by clock signals to enable a position error to be generated for track following purposes.

In some sector servo systems, the servo tracks in the sector portions are in the form of blocks of servo information, one set of blocks on one track being identified as block A signals and an adjacent track contains blocks identified as block B signals. The boundary between adjacent servo blocks is aligned with the data track center in the following data portion of the disk. Track following to maintain the head positioned over the data track center is accomplished by positioning the head near the desired location (by track accessing circuitry which does not form part of the present invention) and then reading and comparing the signals recorded in the servo blocks on adjacent servo tracks in the sector. When the head is located over the data track center, it will receive equal signals from block A signals and block B signals, and integration of the energy level of the signals and the comparison of these energy levels will result in a null condition, indicating that the head is located on the data track centerline. If the head is located off the data track centerline, the head will be located over more of one type of servo block than the other adjacent type so that the signals from the two types of blocks will not be equal, and energy integration and comparison of the two types of signals will result in the generation of a position error signal (PES) which can be used in the servo system to move the head toward the proper position over the data track centerline.

In sector servo systems, the servo information detected during reading of the servo information is stored and utilized during the interval that the head is over the subsequent data portion of the record to maintain the head over the data track centerline.

In addition to the blocks of servo information in the sector areas of the disk, these areas also contain signals which are utilized to indicate to the servo system that a data portion is approaching. These latter signals are referred to as SYNC signals and are located between the end of the servo blocks and the start of a data portion. These SYNC signals are of a unique characteristic so that they can not be mistaken for servo or data signals and are used both to indicate the approach of a data portion and to synchronize a clock which is used in conjunction with data recording.

In using sector servo information, it is essential to know that the servo information is valid and accurate both at the time of the original recording of the information and during subsequent use of the disk, since defective servo information could lead to the off-track positioning of the transducer with consequent reading or writing on an incorrect data track.

PRIOR ART

U.S. Pat. No. 3,725,861, Hancock, shows a disk file having a separate servo disk and having record tracks which contain portions of clock synchronization information, and portions of track descriptor information indicating a defective or defect-free data portion. However, Hancock does not provide any indication of the quality of the servo information on the disk file.

U.S. Pat. No. 3,919,697, Walker, shows an optical sector servo with serially arranged optical spots. Spots 30, 30' are centered on every fourth track. Such optical spots do not indicate faithfulness of track following as does the synch portions of servo signal provided by the present invention.

U.S. Pat. No. 4,048,660, Dennison et al, shows another servo system wherein some of the signal patterns (FIG. 3) are incidentally centered on a data track (item 117). Again the faithfulness indication of the present invention of track following is not provided.

U.S. Pat. No. 3,864,741, Schwarz, shows inserting a special sector in servo tracks in a dedicated servo circuit. Such calibration, while improving servo operation, does not provide a faithfulness indication of track following along the tracks length as provided by the present invention.

THE INVENTION

In accordance with the present invention, a SYNC mark placed between an area of sector servo information and the following data is encoded in a manner to provide an indication of the validity of the immediately preceding sector servo information. If the sector servo information is vaid, the SYNC mark is encoded to so indicate, and the servo information is used in the normal manner for track following operations. If the sector servo information is defective, the following SYNC mark is encoded to indicate this, and detection of this encoding is utilized to cause the servo system to discard or ignore the defective servo information for track following, and the system relies on prior sector servo information for track following through the data area until the next sector servo area is reached.

The defective sector servo information may have resulted from an error or damage at the time the servo information was written, usually at the factory, at the time of manufacture of the disk. In this event, the appropriate SYNC block can be modified at that time to reflect the defective nature of the servo information. If originally valid servo information becomes invalid or defective in use after manufacture, such as from handling damage or from contact with the magnetic head, the appropriate SYNC block may be modified in the field to indicate the defective servo area.

In addition to providing an indication of the validity of the preceding servo information, the SYNC mark encoding may be employed to present inadvertent off-track positioning. One example of a situation which the present invention protects against is the scratching of the disk in one of the servo tracks in a servo sector. Such scratches are not uncommon in the use of flexible disks which are repeatedly inserted and withdrawn from the disk drive apparatus. Such a scratch can greatly reduce or eliminate the magnetic properties of the scratched portion so that the magnetic head receives little or no signal in passing over the scratched area. Since, as discussed above, the servo system operates to balance the energy levels of signals received from adjacent block A and block B tracks, the lack of sufficient signal from the scratched track will cause an energy imbalance to be sensed by the servo system, even though the head is properly positioned over the data track centerline.

Under these circumstances, and without the benefit of the present invention, the servo system would attempt to correct the sensed imbalance by moving the head toward the servo block having the scratch or defect, thereby moving the head off the proper data track centerline. This situation could continue until the servo system had moved the head completely off the desired data track centerline until it located an undamaged pair of servo blocks to properly balance the servo, thus resulting in totally incorrect positioning information.

Another factor which could cause off-track positioning is the temporary presence of a particle or particles under the head which would cause the head to read the servo tracks unevenly. Additional causes of possible erroneous off-track indications are the drifting of the servo circuits with time or temperature, and uncertainties about the flying characteristics of the head when it is first installed.

In accordance with a feature of the present invention, each SYNC mark is aligned with a data track and contains a predetermined number of pulses, these pulses being of one type when the preceding servo information is correct, and being of another type to indicate that the preceding sero information is defective. In addition to indicating whether the servo information is valid or defective, the pulses in the SYNC block are counted in a way to ensure that only a certain number of such pulses are permitted. If the counting indicates that more than the predetermined number of pulses are sensed during the SYNC block, an error indication is given and data writing in the following area may be inhibited. Such an excess count would occur in the situation of the scratched or otherwise damaged servo track described above where the servo system would attempt to obtain a null condition, but would in fact be moving the head off the proper data track centerline toward an adjacent data track. Under these circumstances, the servo circuitry would detect pulses from the SYNC marks associated with both the proper data track and the adjacent data track, resulting in detection of more pulses than should be associated with a single SYNC mark and resulting in the generation of an error condition signal to inhibit data writing on what would be the incorrect data track.

DESCRIPTION OF THE BEST MODE AND INDUSTRIAL APPLICABILITY

Figure 1:
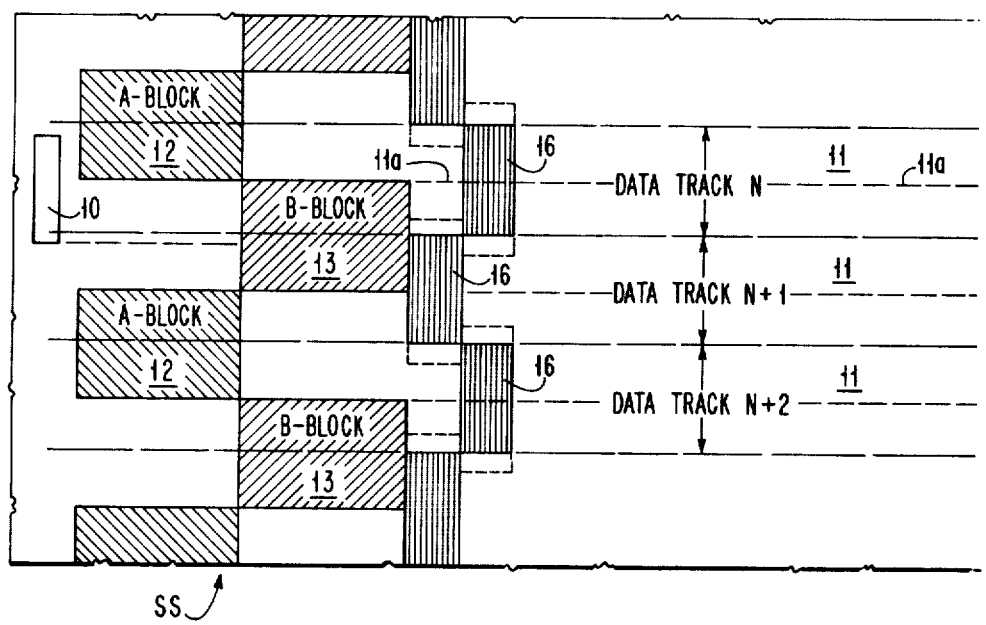
FIG. 1 is a representation of the layout of a portion of a disk file servo sector, showing the relationship among the servo blocks, the SYNC marks and the data tracks.

FIG. 1 illustrates a portion of a disk file servo sector in accordance with the present invention. A plurality of data tracks 11 are provided, tracks 11 being adjacent to each other and identified as tracks N, track N+1, etc. The data tracks, servo tracks and SYNC marks are read by a magnetic head 10 which is movable under the control of the servo system to be positioned over the desired data track and maintained in that position. Preceding data tracks 11 is sector servo information and a SYNC mark. The servo information is in the form of blocks of servo signals in adjacent tracks, these servo blocks being offset from each other along the servo track length. As shown, the servo signals include blocks of one type of signal, identified as servo block A signals 12, and blocks of another type of servo signal identified as servo block B signals 13. Servo block A signals 12 are spaced from each other along the servo track, as are the blocks of servo block B signals 13. Each block A signal abuts a block B signal in an adjacent track, and the boundary between adjacent block A and block B signals defines the centerline 11a of one of the data tracks 11.

As indicated above, the servo system operates during track following operations to sense the signals in block A and block B tracks and attempt to position the magnetic head so as to balance the energy levels of the signals from these blocks to produce a null condition which should indicate that the head is positioned over a data track centerline 11a. Circuitry for generating the position error signal is shown and described in U.S. application Ser. No. 906,301, filed May 15, 1978, now U.S. Pat. No. 4,195,320, assigned to the same assignee as the present application. The information detected by the servo system during the reading of a servo sector is stored and used to control the position of head 10 while it is passing over the following data portion of the disk. In practice, it has been found that the provision of 53 sectors of servo information interspersed with data portions provides for satisfactory track following operation.

The SYNC mark 16 is located between the end of the sector servo information and the start of the data portion and is used to indicate to the servo system that a data portion is approaching, to synchronize timing circuitry used during operations on the data portion, and to perform the novel functions of this invention, as will be described below. The SYNC mark is of any suitable duration and preferably has a width corresponding to the width of head 10 so that it can be modified during use by head 10 if required. SYNC mark 16 may be of any suitable pattern, and one possible pattern is in the form of a series of positive-going pulses, all but one of which are common duration pulses, while one pulse in approximately the middle of the pattern has a duration longer than the other pulses. Such a pattern may be considered the normal pattern for the SYNC mark and indicates that there are no defects in the preceding sector servo information.

Figure 2:
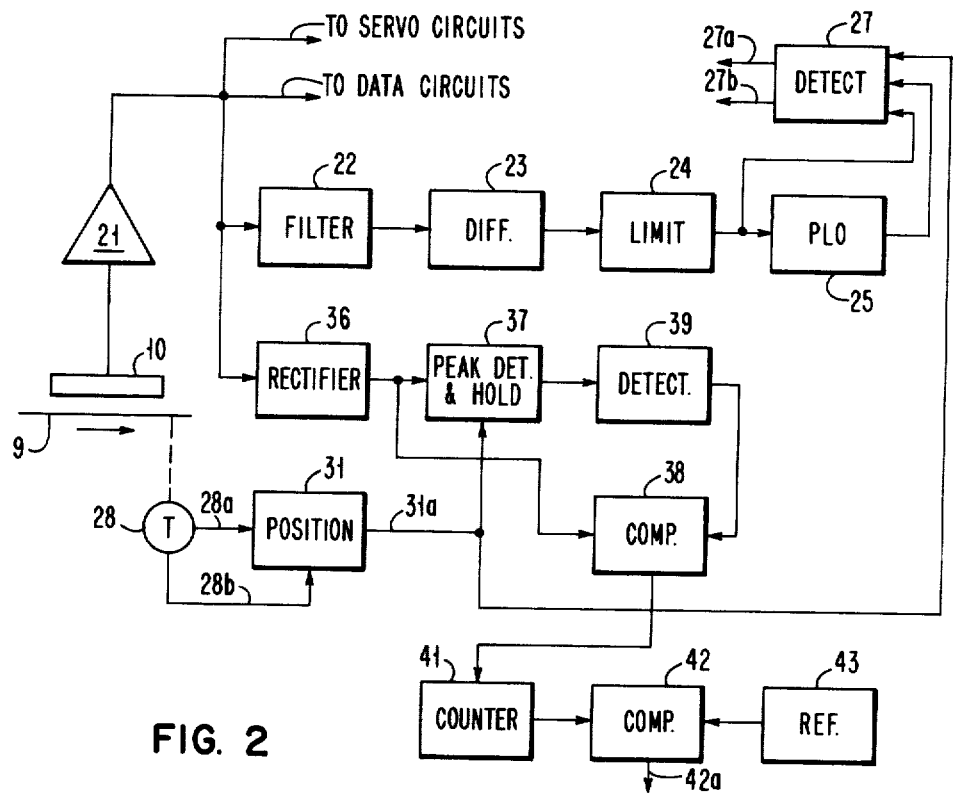
FIG. 2 is a a block diagram of circuitry for detecting and decoding the SYNC mark signals to provide the two protective functions of the present invention.
Figure 3:
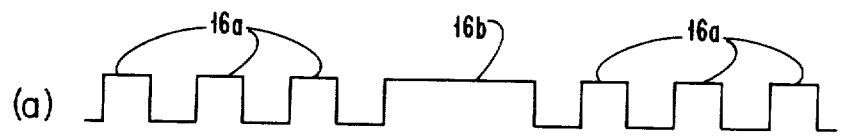
FIG. 3 shows the shape of signals usable in the SYNC mark of the present invention.
Figure 3:
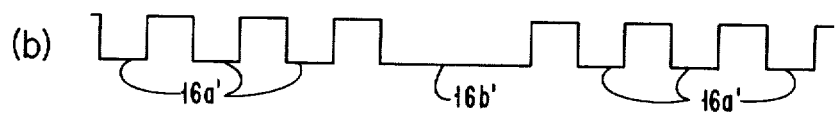

Referring to FIG. 2, circuitry is shown there for carrying out the features of this invention. Preferably, the servo blocks A and B also contain track address information which is detected and used in conjunction with the SYNC mark information in track following operations. Magnetic head 10 is shown positioned adjacent to the magnetic disk 9 on which are recorded the servo, SYNC and data signals. The output signal from head 10 is supplied through a preamplifier 21 to a band pass filter network 22. Bandpass filter 22 rejects the higher frequency data signals from head 10 and passes the servo and SYNC signals, which are only about one-sixth the frequency of the data signals. As shown in FIG. 2, the output of amplifier 21 is also supplied to data circuits and to servo circuits for use during those portions of an operation. The output of network 22 is supplied to a differentiator network 23 whose output is supplied to a limiter network 24. Limiter 24 limits the peaks of the differentiated signal to produce a waveform as shown in FIG. 3a and supplies this limited signal in parallel to a phase lock oscillator (PLO) 25 and to detection circuitry 27. The output of limiter 24 has portions of one duration 16a and a central portion 16b having a duration of two bit cells. PLO 25 serves as the master oscillator for reading and writing on disk 9, and the pulses supplied to the PLO act to synchronize it for subsequent operations on the data portion of the disk. The output of PLO 25 is supplied as one input to detection circuitry 27. The thrd input to detection circuitry 27 is supplied from a tachometer system which includes a tachometer 28 which is driven by the spindle which is rotating disk 9. Tachometer 28 preferrably has two outputs represented by lines 28a and 28b. One line is supplied with one pulse for each revolution of disk 9, while the other line produces a plurality of pulses, such as 3600, for each revolution of disk 9. Lines 28a, 28b are inputs to a position generating network 31 which has an output line 31a on which appear a plurality of pulses during each revolution of disk 9, as well as a distinctive index pulse once each revolution of disk 9. In particular, network 31 provides enabling pulses to detector 27 during the period that the SYNC mark should appear in each sector, and does not supply such enabling pulses during other portions of the sector and during the data portions of the record.

Detection network 27, when enabled by signals from network 31, operates on the two other input signals supplied thereto to determine whether the detected SYNC mark has the proper waveform, indicating valid servo data preceding the SYNC mark. If the proper pattern is detected, an output line 27a is raised indicating that the track address information has been received, and the SYNC mark shows that the preceding servo data is valid and may be used for track following in the following data portion.

The circuitry in detector 27 may be such as to look for certain levels in the signal of FIG. 3a from limiter 24 in synchronism with the clock pulses from PLO 26. In the illustrated embodiment, detector 27 may look for "up" level signals during the two bit cell times represented by 16b of FIG. 3a, and to recognize this occurrence to indicate that the SYNC block is valid for the preceding servo information. This valid SYNC mark indication, together with detection of proper track address information in the servo blocks results in the raising of line 27a to indicate that the servo information is usable.

To change the SYNC mark information to indicate that the preceding servo information is defective, the SYNC mark may be encoded with a signal which would result in a pattern out of limiter 24 as shown in FIG. 3b. It will be seen that this pattern is essentially the mirror image of the pattern of FIG. 3a, and has a "down" level portion 16b' over two bit cell times in contrast to the "up" level signal for this interval 16b of FIG. 3a. It will be understood that this SYNC mark pattern may be changed from valid to defective whenever defective sector servo information is detected, either after writing the servo pattern at the factory or after use of the disk in the field.

When the pattern of FIG. 3b is supplied to detector 27 from limiter 24, detector 27 determines that the pattern does not have an "up" level signal over the two bit cell periods, which would indicate valid servo information. Detector 27 thus indicates defective servo information by raising a signal on line 27b which signals the servo system to ignore the servo information from the preceding servo sector, and to rely on earlier servo information for track following over the following data portion.

To carry out the additional function of preventing scratches on one servo track from producing erroneous track following, circuitry including a full wave rectifier 36 and a peak detector and hold network 37 are employed. Rectifier 36 receives the output of bandpass filter 22 and supplies it in parallel to network 37 and to a comparator 38. Network 37 operates to detect the peak of the SYNC mark signals and to hold this value as on hundred percent of the signal. This one hundred percent value is then scaled by a suitable factor, such as ten percent, in detector 39 and supplied as another input to comparator 38. This arrangement operates to produce a count pulse from comparator 38 for each pulse from rectifier 36 which exceeds ten percent of the peak SYNC mark value as held in circuit 37. Circuit 37 is enabled by signals from position circuitry 31, in the same manner as described above for detector network 27, so that circuit 37 is enabled only during the period when the SYNC mark should occur.

Output pulses from comparator 38 are supplied to a counter 41 whose output is supplied to a comparator 42. Comparator 42 receives a reference count input from an off track tolerance circuit 43, the input from circuit 43 being set in accordance with a number of counts which represent the limit of off-track to be permitted. When the number of pulses received from counter 41 exceeds the reference limit from circuit 43, an output line 42a on comparator 42 is raised.

In operation with a scratched or otherwise defective servo track as described above, the servo system will attempt to obtain an energy null and will move the head further toward the defective track. In this situation, the head will read not only the SYNC mark associated with the proper servo track pair but also the adjacent SYNC mark. This will result in more pulses being supplied through rectifier 36 to comparator 38 than would occur if only one SYNC mark were being read. The number of such pulses which exceed the scaled factor established by circuits 37 and 39 pass through comparator 38 and counter 41 to comparator 42. If the number of such pulses exceeds the reference value set up by circuit 43, line 42 is raised to indicate an off track condition so that appropriate protective action may be taken. Such action may include inhibiting data write operations on the following data portion to prevent improper writing on what would be the wrong data track.

We claim:

1. A track following disk file including a record storage disk having a plurality of circumferentially spaced apart servo signal sectors, each sector having servo signals identifying a data track location line for track following, said data track locations containing recorded data signals, each of said servo sectors for each of said data track locations lines including a sync signal recorded adjacent a trailing edge of a servo signal and centered on said data track location line, each said sync signal including recorded information relative to the validity of the servo signals in its associated sector, transducing means for reproducing said servo signals, said sync signals and said data signals, means for separating said sync signals from said reproduced signals, means operative only during the approximate time interval of occurrence of each of said sync signals for decoding each said sync signal to determine the validity of the servo signals in its associated sector, and means for modifying any of said sync signals indicating valid servo signals if said servo signals subsequently become invalid.

2. Apparatus in accordance with claim 1 in which said sync signal serves the additional function of synchronizing clocking means and indicating the approach of a data portion of the disk.

3. Apparatus in accordance with claim 1, including means responsive to a determination of the invalidity of the servo signals in a sector for disregarding those invalid servo signals in track following operations.

4. Apparatus in accordance with claim 1, in which each said sync signal has a predetermined pattern to indicate valid sector servo information and has a different pattern to indicate invalid sector servo information.

5. Apparatus in accordance with claim 4, in which said predetermined pattern includes a predetermined number of pulses, and means for counting the number of pulses in said sync signal to detect the reading of more than one sync signal in a sector.

* * * * *